Oct. 6, 1953   F. PRESS   2,654,874
SEISMIC EXPLORATION SYSTEM
Filed June 14, 1951   3 Sheets-Sheet 1

INVENTOR.
FRANK PRESS
BY *Sidney G. Johnson*

ATTORNEY

Oct. 6, 1953          F. PRESS          2,654,874
SEISMIC EXPLORATION SYSTEM
Filed June 14, 1951          3 Sheets-Sheet 2

INVENTOR.
FRANK PRESS

BY

ATTORNEY

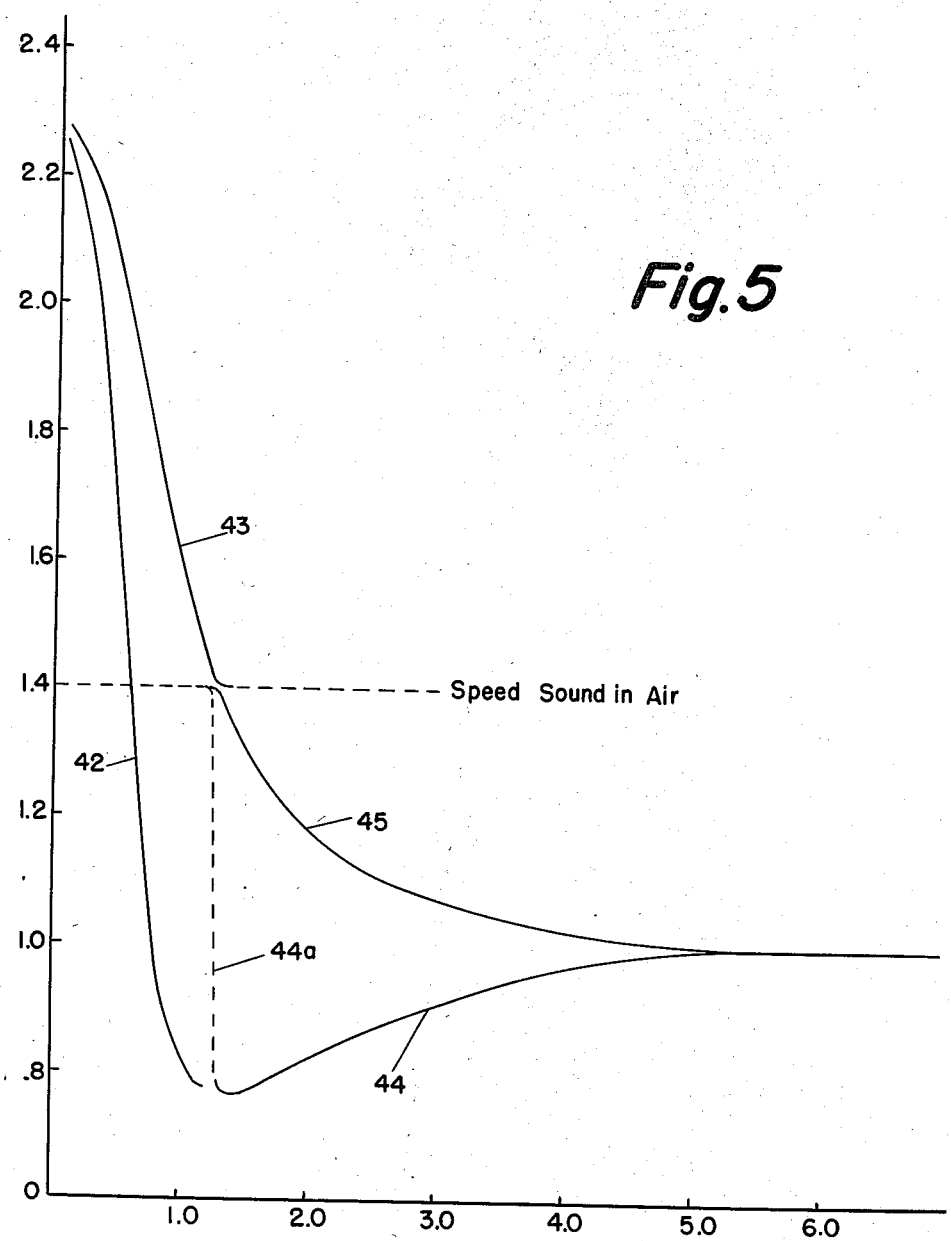

Patented Oct. 6, 1953

2,654,874

UNITED STATES PATENT OFFICE 2,654,874

SEISMIC EXPLORATION SYSTEM

Frank Press, Palisades, N. Y., assignor, by mesne assignments, to Socony-Vacuum Oil Company, Incorporated, New York, N. Y., a corporation of Texas Application June 14, 1951, Serial No. 231,503

5 Claims. (Cl. 340—15)

1

This invention relates to geophysical exploraration and more particularly to methods and systems for seismic prospecting in regions in which difficulty has been experienced in recording reflections from subsurface interfaces.

In seismic exploration, acoustical energy is released at a sending station for generation of seismic waves which are reflected back to the surface from subsurface interfaces arriving a time interval after generation depending upon the depth of the interfaces below the sending station. The release of acoustical energy generally by an explosion of dynamite gives rise not only to the seismic waves, but it also generates surface waves which travel in the weathered surface layer which may be of varying thickness. The surface waves arriving at a receiving station at the same time as the reflections, of course, are detected along with the reflections and tend to obscure them and to destroy or greatly decrease the usefulness of the record.

In accordance with one aspect of the present invention, advantage is taken of the discovery that for a subsurface release of acoustical energy, the surface waves are often of gradually increasing frequency. When the phase velocity of the surface waves becomes approximately equal to that of sound in air, the resultant earth movement generates constant frequency air waves of the same frequency as the surface waves. Accordingly, by placing a detector in air at a receiving station, signals will be generated corresponding in frequency with the air waves, which signals when mixed with those from the detector of the seismic reflections will cancel from the resultant record the effect of the surface waves, leaving in bold relief any reflections which may be present. Stated differently, it has been found that after the explosion of dynamite in a shot-hole there is at the remotely spaced receiving station a period during which there is resonant coupling between the atmosphere and the surface waves or "ground roll," during which resonant period air waves are generated of a frequency and phase velocity the same as that of the ground roll. Accordingly, during that period of resonance the obscuring effect on the seismic waves reflected from subsurface interfaces may be eliminated. The invention is of general application to seismic exploration, the only requirement being that the receiving station be spaced from the sending station a distance substantially greater than the thickness of the surface layer, and in general it will be spaced from ten to one hundred or more times the thickness of the surface layer.

In a reciprocal manner, an air shot generates surface waves having constant frequency and phase velocity equal to the speed of sound in air. In accordance with this aspect of the invention, improved records may be secured by exploding the dynamite in air in the form of subdivided charges each spaced a distance apart equal to speed of sound in air divided by twice the frequency, i. e., a half-wavelength apart. When the charges are spaced a half-wavelength apart in air, there will be a surprising cancellation of the air-coupled ground roll.

For further objects and advantages of the invention and for a more detailed explanation of the invention, reference is to be had to the following description taken in conjunction with the accompanying drawings, in which:

Fig. 1 in block diagram and partly by single-line representation of electrical circuits diagrammatically represents in accordance with the invention the arrangement of elements of the seismic exploring system, together with a suggested cross-section of a part of the earth with respect to which the seismic exploration is to be conducted;

Figure 1:
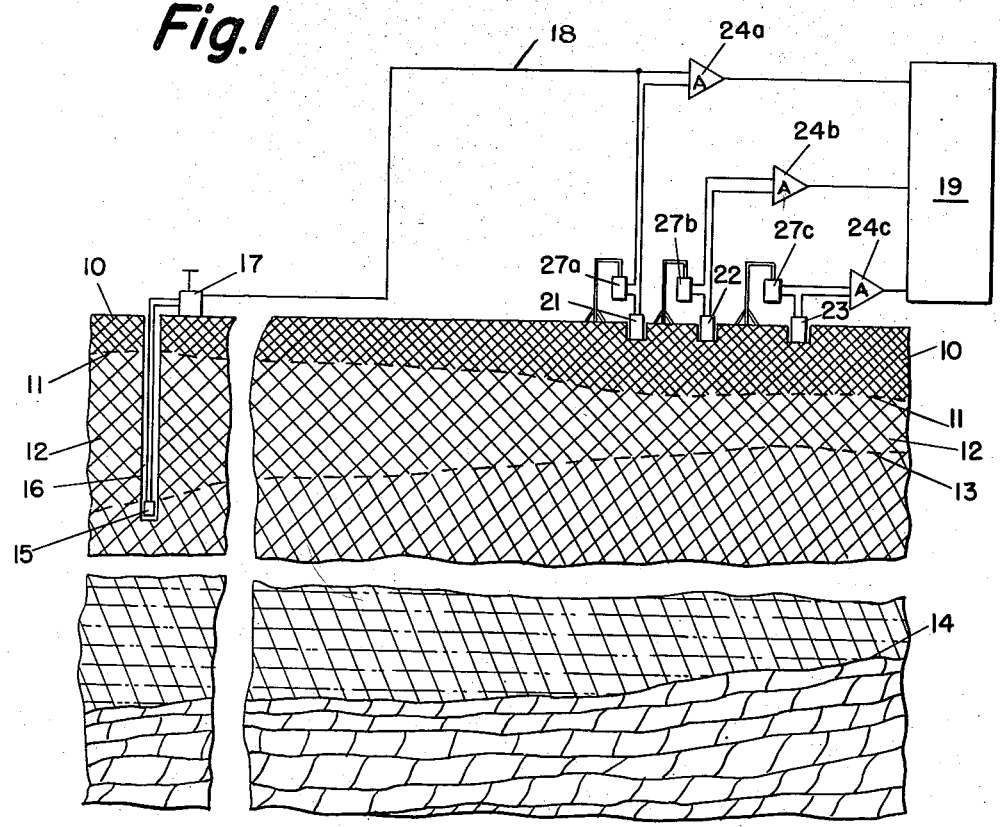
Figure 4:
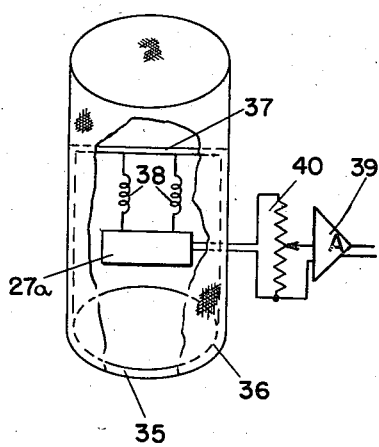

Fig. 4 schematically illustrates in perspective the microphone of Fig. 1;

Fig. 5 presents graphs useful in understanding the invention; and

Figure 6:
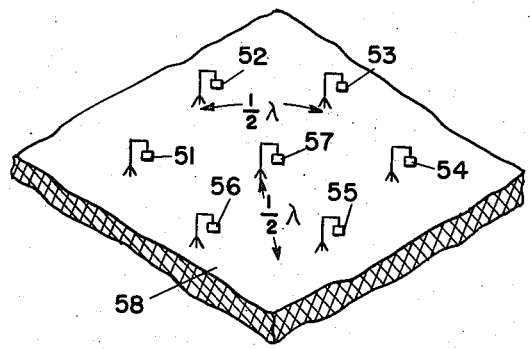

Fig. 6 illustrates a typical arrangement of dynamite charges for substantial cancellation of ground roll.

Referring to the drawings, the invention in one form has been shown applied to an area of the earth's surface in which the upper or weathered layer 10 is generally of the unconsolidated type of formation characteristic of wide areas of the earth's surface. Such a layer may extend to substantial depths, as from thirty to fifty feet or more, and it may be of irregular thickness as indicated by the broken line 11 which marks an interface between the surface layer and the under-layer 12 which is of differing density and of differing physical characteristics. Other interfaces between the differing layers are indicated at 13 and 14, it being understood that there may be many interfaces in any given area, those characteristic of a salt dome and the like being of maximum interest when oil is the object of the exploratory work.

In accordance with one aspect of the invention, acoustical energy is released at a sending station as by a charge of dynamite 15 located, with suitable tamping, in a shot-hole 16 which may be of any suitable depth. The charge 15 of dynamite is detonated by a suitable blasting mechanism 17 which, through a suitable signal transmission circuit 18, indicates on the seismogram produced by a recorder 19 the "shot instant," that is, the instant of release of the acoustical energy which gives rise to seismic waves.

The acoustical waves generated by the explosion of dynamite are transmitted in all directions from the sending station. For convenience in description, the waves which travel downwardly through the earth and which are reflected from each of the successive interfaces will be referred to as seismic waves or seismic reflections, whereas the acoustical waves which travel in the surface layer 10 will be referred to as the surface waves.

At a receiving station spaced a substantial distance from the sending station there are located seismic wave detectors or geophones 21, 22 and 23, it being understood that there may be many geophones, only three of which have been illustrated in Fig. 1. The signals from the geophones are respectively applied to the input circuits of amplifiers 24a–24c and recorded by recorder 19, the amplifiers being provided with gain control and filters in manner well understood by those skilled in the art.

Figure 2:
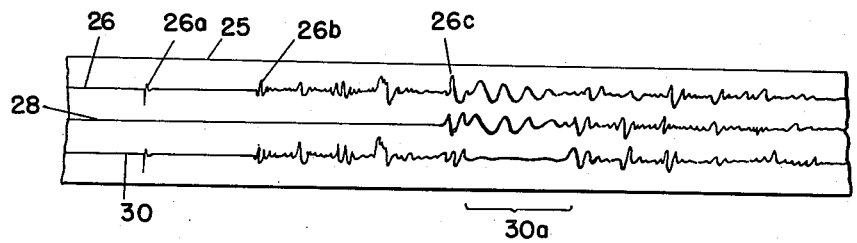
Fig. 2 is a seismogram illustrating the signals received from a seismic wave detector, a microphone, and the resultant record produced by the present invention.

In the seismogram 25 of Fig. 2, the trace 26 illustrates the record produced by a typical one of geophones 21–23. The shot instant is recorded at 26a followed by arrival of the first reflection 26b from a shallow interface. At the point 26c, there appears a signal or wave of substantial amplitude due to the surface waves or ground roll. These waves are of gradually increasing frequency. If during the time of reception of the surface waves a reflection were to arrive at one of the geophones, it will be seen that the large-amplitude surface waves would seriously interfere with or obscure such reflection, making it virtually impossible to recognize the reflection separate and apart from ground roll.

In accordance with the present invention, advantage is taken of the fact that when the phase velocity of the surface waves becomes approximately equal to the speed of sound in air the ground roll or resultant movement of the surface generates air waves of corresponding frequency. Accordingly, by locating detectors such as microphones 27a–27c in air, as shown in Fig. 1, respectively adjacent each geophone, signals can be generated having the same frequency as the ground roll. By mixing the signals from each of the microphones 27a–27c with the signals from each of geophones 21–23, the effect of ground roll in each circuit to recorder 19 may be cancelled and the obscuring effect thereof eliminated from the seismogram.

Referring now to trace 28 of seismogram 25 of Fig. 2, which is a record of the signals generated by the microphone 27a, it will be seen that the trace is quiescent during the early part of the seismogram, but as the ground roll appears on trace 26, it also appears on trace 28. On trace 28 it appears in phase with the wave of trace 26. By proper phasing of the signals from the microphone 27a as by connecting it in reverse polarity or in phase opposition to geophone 21, the signals from air-microphone 27a will cancel the ground-roll signal from the geophone 21. Where other than a 180° phase shift is necessary, differentiating or integrating circuits may be included in the output from each of the microphones 27a–27c and by adjustment of a volume control 40 shown in Fig. 4 of each of the amplifiers associated with the microphones one of which, the amplifier 39, is shown in Fig. 4, the amplitude of the signals may be adjusted for maximum cancellation of the effects of ground roll. Those skilled in the art will understand that for a particular frequency a differentiating or an integrating circuit basically shifts the phase and each represents a convenient system for changing the phase of the signals other than the 180° phase shift accomplished by simple reversal of the leads from each of microphones 27a–27c relative to those from the geophones 21–23.

By thus applying the signals from the microphones 27a–27c in phase relation respectively to cancel like signals from the geophones 21–23, there will be cancellation of the surface waves as illustrated on the trace 30 of seismogram 25 of Fig. 2. In the region 30a, the trace is quiescent. Hence, if a reflection, seismic waves from a subsurface interface, were to be received during the time interval 30a, it would not be obscured by ground roll or surface waves but would appear in its true character.

The duration of the quiescent period 30a increases linearly with the distance between the sending station and the receiving station. Thus, by changing that distance the quiescent period may not only be lengthened or shortened, but also its time-location on the seismogram will be shifted. Thus, a quiescent zone corresponding with 30a of Fig. 2 can be located on the seismogram in the region where reflections appear. Hence, they can be recorded in recognizable manner unobscured by surface waves or ground roll.

The appearance of the air waves at the receiving station appears to be due to the fact that resonant coupling between the surface of the earth at the receiving station and the air arises when the phase velocity of the surface waves becomes approximately equal to the speed of sound in air at the receiving station. Since the surface waves are dispersive, it will be understood that the speed of movement of the crests or peaks of each wave, corresponding to phase velocity, gradually decreases. When the peaks move with the same speed as sound in air, there is sufficiently good coupling between the surface and the air to generate air waves of amplitude adequate for detection by each of microphones 27a–27c, a phenomenon which I believe I am the first to discover and to make practical application thereof.

In Fig. 4, there is illustrated one form of a microphone utilized for detecting the air-coupled wave. The microphone apparatus comprises a base member 35 which supports a frame structure covered by silk or other fabric 36 shown cut away to expose the microphone suspended inside. The silk or fabric covering 36 eliminates wind noise. A transverse bar 37 extending across the frame supports a pair of springs 38 which in turn support a microphone 27a. An additional mass (not shown) may be added to provide a low-frequency suspension for eliminating any effect on the microphone of earth vibrations. The microphone 27a may be either of the condenser or crystal type. A suitable microphone, and amplifying system schematically shown at 39 is currently available on the market under the trade-name of "Tru-Sonic Microphone Ssystem," Model C–1C, a product of the Stephens Manufacturing Company, Culver City, California. A volume control 40 is also schematically illustrated for control of the amplitude of the detected air waves.

Figure 3:
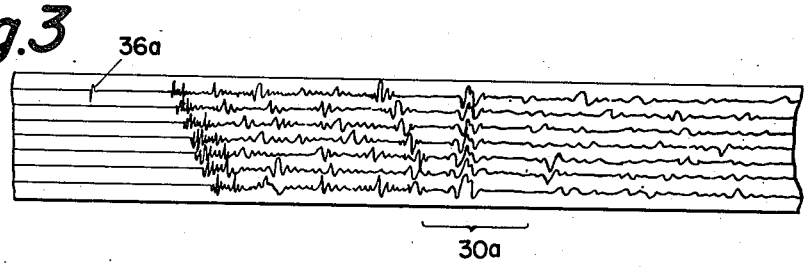
Fig. 3 is a reproduction of a plurality of traces of a typical seismogram referred to in further explanation of the invention.

While in Fig. 2 there has been shown but a single trace 30 embodying the cancellation features of the present invention, it will be apparent that a plurality of microphone-geophone combinations, such as illustrated in Fig. 1, may be utilized to produce a multiple trace record such as illustrated in Fig. 3 embodying the cancellation of undesired ground roll during the period or time interval 30a in which the reflections appear.

Details of systems for obtaining such multiple trace records are well known in the art and are, therefore, not described since from the foregoing explanation applicant's invention may be readily applied in the production of such records.

A further explanation of the present invention will now be presented in terms of the graphs of Fig. 5. It is well understood by those skilled in the art that in a dispersive medium, such as earth formations of the type above described, the sequence of waves arriving at a given point can be ascertained from a consideration of the group velocity curves. Group velocity may be defined as the velocity at which a particular frequency in the group of frequencies travels. In Fig. 5 the graph 42 is plotted with a parameter proportional to the frequency as abscissae and the ratio of group velocity to the speed of sound in air as ordinates. Thus, it will be seen that as the frequency increases, the group velocity and the dimensionless ratio representative thereof decreases. The graph 42 is representative of the train of Rayleigh waves usually associated with ground roll from a hole shot. They first appear at the receiving station as low-frequency waves with the later arriving waves of gradually higher frequencies. The graph 43 is representative of the change in phase velocity of the waves represented by graph 42. Ratios of phase velocity with respect to the speed of sound in air have been plotted as ordinates in order to provide dimensionless values with abscissae the same as for graph 42.

The graph 44 has a broken-line branch 44a which represents further phenomena, advantage of which is taken in accordance with the present invention. The solid-line section of graph 44 is representative of the group velocity of the waves resulting from a hole shot, that is, a sudden release of acoustical energy as by the explosion of dynamite below the surface of the earth. The fairly poor elasticity of the weathered layer absorbs most of the high-frequency energy represented by the graph 44, and the train of waves of such higher frequency has not been of very great concern in seismic exploration except in those regions where they have not been to large extent absorbed by the weathered layer.

The graph 45 illustrates the change in phase velocity for the waves representative of the graph 44. When their phase velocity approaches that of the speed of sound in air, it will be observed that there appears the vertical portion or branch 44a of graph 44. The vertical portion is representative of waves of single frequency. Thus, ground roll or surface waves resulting from an explosion of dynamite below the surface of the earth produces sound waves in the air of single frequency. In a reciprocal manner, an explosion above the ground produces ground roll of a single frequency having phase velocity equal to the speed of sound in air. Not only will there be propagated a constant-frequency wave train, but since the coupling between the atmosphere and the earth will be greatest, as has already been explained, the amplitude of the constant-frequency waves will be greatest and will tend completely to obscure the arrival of reflections during the time the ground roll or surface waves are detected at the geophones located at the receiving station. It has further been found that the amplitude of the constant-frequency wave train is independent of the height above the earth's surface within a fairly wide range.

The phenomenon just explained is that which is utilized in the above description to produce the cancellation of ground roll from the seismograms.

The branch 44a of graph 44 is representative of the conditions under which there is coupling of the ground roll or surface waves to produce atmospheric compressional waves. Such compressional waves are followed by a train of constant frequency waves indicated by the vertical portion of branch 44a. It is to be observed that the single frequency of the waves following the air pulse will be identical with that of the waves of the ground roll where their phase velocity equals that of the speed of sound in air.

While the graphs of Fig. 5 confirm the theory as set forth above, certain additional observations may be made with respect to it in explanation of a further aspect of the invention. If the abrupt release of acoustical energy as by the explosion of dynamite occurs in air above the surface of the earth, waves propagated according to graph 44a will predominate as recorded by the geophones. In this connection, it is to be observed that graph 44a not only stands for the fact that a constant frequency wave train will be propagated by an explosion of dynamite in air, but also since the coupling of the frequencies resulting from the abrupt release of acoustical energy will be greatest for the constant frequency wave train, the amplitude of such waves will be independent of the height of the dynamite above the surface within a fairly wide range; that is to say, whether the dynamite be resting on the ground or whether it be a hundred feet above the ground and, of course, whether the receiving station is spaced nearby or at a substantial distance from the sending station. After the arrival of the air waves at the geophones, however, the character of the seismogram will be independent of the height of the charge above the surface. Since the ground roll from an air shot may be expected to predominate over the seismic waves, it is desirable to eliminate the ground roll in manner which will now be described.

As illustrated in Fig. 6, the charges 51-57 of explosives are suspended in air a convenient distance above the earth's surface 58 with the spacing from each charge to the adjacent charge a distance a half-wavelength (½λ) apart. Thus, there will be cancellation of the frequencies of that wavelength in avoidance of resulting ground roll. The distance between each dynamite charge will be selected within the range of from 115 feet to 5 feet, corresponding to a half-wavelength for the frequency range of from five to one hundred twenty cycles per second. Within this range the selection will be made on the basis of local conditions, that is, the nature of subsurface strata at the subsurface interfaces and the amplitude of reflected energy of particular frequencies within the aforesaid range. The particular frequency selected in determination of the spacing of the charges is preferably experimentally determined in the following manner.

An air charge is exploded and the ground roll measured or recorded on the seismogram by a geophone located at the surface of the earth at a substantial distance from the air-suspended charge. If that frequency as experimentally determined be divided into the speed of sound in air, the wavelength will be known and the distance for the spacing of the charges for maximum cancellation will be fixed. The particular frequency of the ground roll depends upon the elastic constants of the surface or weathered layer of the earth including the shear velocity thereof. Thus, it will be seen that in accordance with the present invention new techniques have been provided for securing seismic data in regions where other methods have been found to be expensive and in many cases unsuccessful.

While particular modifications have been illustrated and described, it will be apparent that further modifications will now suggest themselves to those skilled in the art, and it is intended to cover such modifications as fall within the scope of the appended claims.

What is claimed is:

1. In seismic exploration, the method which comprises releasing acoustical energy at a subsurface sending station for generating seismic waves which are reflected back to the surface from subsurface interfaces arriving a time interval after generation depending upon the depth of said interfaces, detecting reflected seismic waves upon arrival at a receiving station spaced a substantial distance from the sending station, said release of acoustical energy also generating surface waves which at said receiving station are of gradually increasing frequency and which tend to obscure reflected seismic waves, cancelling at said receiving station said obscuring effect of said surface waves in the range of frequencies where their phase velocity is approximately equal to that of sound in air by (a) generating signals from air waves produced by resonant coupling of earth movement produced by said surface waves at said receiving station, and (b) mixing said generated signals with those detected at said receiving station to cancel the obscuring effect of said ground waves upon said reflected seismic waves.

2. In seismic exploration, the method which comprises releasing acoustical energy at a subsurface sending station for generating seismic waves which are reflected back to the surface from subsurface interfaces arriving a time interval after generation depending upon the depth of said interfaces, detecting reflected seismic waves upon arrival at a receiving station spaced a substantial distance from the sending station, said release of acoustical energy also generating surface waves which at said receiving station are of gradually increasing frequency and which tend to obscure reflected seismic waves, cancelling at said receiving station said obscuring effect of said surface waves in the range of frequencies where their phase velocity is approximately equal to that of sound in air by (a) detecting air waves produced by resonant coupling of earth movement produced by said surface waves at said receiving station, and (b) mixing signals of the same frequency as said air waves at said receiving station with said seismic waves to cancel the obscuring effect of said ground waves upon reflected seismic waves.

3. In seismic exploration, the method which comprises releasing acoustical energy at a subsurface sending station for generating seismic waves which are reflected back to the surface from subsurface interfaces arriving a time interval after generation depending upon the depth of said interfaces, detecting reflected seismic waves upon arrival at a receiving station spaced a substantial distance from the sending station, said release of acoustical energy also generating surface waves which at said receiving station are of gradually increasing frequency and which tend to obscure reflected seismic waves, cancelling at said receiving station said obscuring effect of said surface waves in the range of frequencies where their phase velocity is approximately equal to that of sound in air by (a) generating signals from air waves produced by resonant coupling of earth movement produced by said surface waves at said receiving station, (b) adjusting the amplitude of said generated signals to approximately that of said detected ground waves, and (c) mixing said generated signals in phase opposition to those detected at said receiving station to cancel the obscuring effect of said ground waves upon said reflected seismic waves.

4. In seismic exploration, the method which comprises releasing acoustical energy at a subsurface sending station for generating seismic waves which are reflected back to the surface from subsurface interfaces arriving a time interval after generation depending upon the depth of said interfaces, detecting reflected seismic waves at a receiving station spaced a substantial distance from the sending station, said release of acoustical energy also generating surface waves which at said receiving station are of gradually increasing frequency and which tend to obscure reflected seismic waves, during a period of resonance between surface movement of the earth produced by said surface waves and compressional waves in the atmosphere produced thereby generating signals from said compressional waves, and mixing said generated signals with those detected at said receiving station to cancel the obscuring effect of said ground waves upon said reflected seismic waves during said period of resonance.

5. In seismic exploration, the method which comprises releasing acoustical energy at a subsurface sending station for generating seismic waves which are reflected back to the surface from subsurface interfaces arriving a time interval after generation depending upon the depth of said interfaces, detecting reflected seismic waves at a receiving station spaced a substantial distance from the sending station, said release of acoustical energy also generating surface waves which at said receiving station are of gradually increasing frequency and tend to obscure reflected seismic waves, during a period of resonance between surface movement of the earth produced by said surface waves and compressional waves in the atmosphere produced thereby generating signals from said compressional waves, and mixing said generated signals with those detected at said receiving station to cancel the obscuring effect of said ground waves upon said reflected seismic waves during said period of resonance, said distance between the point of release of said energy and said receiving station being selected to produce said cancellation during the time interval reflected waves from an interface arrive at said receiving station.

FRANK PRESS.

References Cited in the file of this patent

UNITED STATES PATENTS

| Number | Name | Date |
| --- | --- | --- |
| 2,450,352 | Piety | Sept. 28, 1948 |
| 2,473,469 | Dahm | June 14, 1949 |
| 2,477,844 | Wolf | Aug. 2, 1949 |
| 2,545,380 | Poulter | Mar. 13, 1951 |